United States Patent

Ciaccia et al.

[11] Patent Number: 5,977,260
[45] Date of Patent: *Nov. 2, 1999

[54] ADHESIVE THERMOPLASTIC COMPOSITION

[75] Inventors: Vittorio Ciaccia, Ferrara; Eugenio Longo, Rho; Patrizia Piancastelli, Bologna, all of Italy

[73] Assignee: Enichem Elastomeri S.r.l., Milan, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/677,807

[22] Filed: Jul. 10, 1996

[30] Foreign Application Priority Data

Jul. 14, 1995 [IT] Italy ................... MI95A1511

[51] Int. Cl.$^6$ ...................................... C08L 9/00
[52] U.S. Cl. ................... 525/236; 525/232; 428/517; 428/519
[58] Field of Search .................. 525/232, 236; 428/517, 519

[56] References Cited

U.S. PATENT DOCUMENTS

| | | |
|---|---|---|
| 4,247,652 | 1/1981 | Matsuda et al. ................... 525/232 |
| 4,271,049 | 6/1981 | Coran et al. ..................... 525/232 |
| 4,948,840 | 8/1990 | Berta ............................ 525/232 |
| 5,073,597 | 12/1991 | Puydak et al. ................... 525/232 |
| 5,523,356 | 6/1996 | Aldrovandi et al. ............... 525/236 |

FOREIGN PATENT DOCUMENTS

| | | |
|---|---|---|
| 0 116 747 | 8/1984 | European Pat. Off. . |
| 116747 | 8/1984 | European Pat. Off. . |
| 0 143 131 | 6/1985 | European Pat. Off. . |
| 143131 | 6/1985 | European Pat. Off. . |
| 0 472 512 A2 | 2/1992 | European Pat. Off. . |

*Primary Examiner*—David W. Wu
*Attorney, Agent, or Firm*—Oblon, Spivak, McClelland, Maier & Neustadt, P.C.

[57] ABSTRACT

Adhesive thermoplastic composition basically consisting of:
1) dynamically vulcanized thermoplastic elastomer;
2) polyethylene having a density equal to or less than 0.920 g/cm$^3$;
3) additives.

The above composition is particularly useful for being firmly bound to articles made of EPM and/or EPDM vulcanized rubbers and for binding parts of vulcanized EPM and/or EPDM to each other.

22 Claims, No Drawings

ADHESIVE THERMOPLASTIC COMPOSITION

The present invention relates to a thermoplastic composition with adhesive properties, particularly useful for the production of articles consisting of at least a part of vulcanized rubber of the EPM or EPDM type and at least one thermoplastic elastomer, connected to each other so as to form a single element.

In the production of some articles, for example curved joints used for welding two profiles of vulcanized elastomer to obtain a sealing gasket, there is the problem of applying a thermoplastic elastomeric component to a vulcanized rubber basically consisting of EPDM or EPM.

It was thought that this could be possible using the known thermoplastic elastomeric blends, also called TPV, as thermoplastic elastomeric component.

Thermoplastic elastomeric blends (TPV) are well-known in patent and scientific literature and are described in many reviews (see for example A.Coran in "Thermoplastic Elastomers; a comprehensive Review", N. R. Legge, G. Holden, H. E. Schroeder eds., New York, 1987, page 130 onwards).

The above TPV consist of a continuous plastic phase, generally a polyolefinic resin, in which a more or less vulcanized elastomer is dispersed, in the form of particles of 50 microns or less.

As the polyolefin contained in the TPV forms the continuous phase, it could be expected that, from the point of view of adhesion, the TPV would behave similarly to the polyolefin.

U.S. Pat. No. 4.537.825 underlines the fact that this behaviour does not occur when the TPV is to be bound, even without adhesives, to articles consisting of vulcanized EPDM or EPM. In particular U.S. Pat. No. 4,537,825 specifies that it is possible to bind the TPV to vulcanized EPDM or EPM only when the content of rubber in the article to be welded is below certain values, more precisely less than 50% in volume.

The problem remained of a still insufficient adhesion between the thermoplastic elastomer and the vulcanized rubber.

The present invention overcomes the above drawback, allowing material to be obtained which is capable of adhering more firmly with respect to a traditional TPV, but at the same time maintaining its elasticity and aspect which are necessary for this kind of application.

In accordance with this, the present invention relates to an adhesive thermoplastic composition basically consisting of:
1) a dynamically vulcanized thermoplastic elastomer (TPV) in a quantity of between 15 and 65% by weight, preferably between 25 and 45% by weight, even more preferably between 30 and 40% by weight; the above dynamically vulcanized thermoplastic elastomer consisting of a continuous phase with thermoplastic properties, mainly consisting of one or more polyolefins, in which a more or less vulcanized elastomeric phase is finely dispersed;
2) polyethylene having a density equal to or less than 0.920 g/cm$^3$, in a quantity of between 85 and 35% by weight, preferably between 75 and 55% by weight, even more preferably between 70 and 60% by weight;
3) additives in a quantity of between 0 and 100, preferably between 10 and 80, even more preferably between 20 and 70, parts per 100 parts of the sum of (1) and (2).

The term "additives" refers to mineral fillers, extension oils, antioxidants, processing aids, dyes, etc., substances well-known to experts in the field.

Typical mineral fillers are silica, kaolin, barite, carbon black; typical processing aids are zinc oxide and stearic acid; typical antioxidants are phenols and sterically hindered amines. The extension oils can be of various kinds, for example, aromatics, naphthenes, paraffins, preferably paraffins.

In a preferred embodiment, the vulcanized thermoplastic elastomer (TPV) has a content of polypropylene of between 15% and 70% by weight, preferably between 20% and 60% by weight, with respect to the total of polymers contained therein.

The term polypropylene refers not only to the homopolymer deriving from the polymerization of propylene, but also copolymers of propylene having up to a maximum of 15%, preferably 10%, of other alpha-olefins.

As mentioned above, vulcanized thermoplastic elastomers (TPV) are well-known in patent and scientific literature and all of them can be used as components of the adhesive thermoplastic composition of the present invention.

Among the TPV known in patent literature, Santoprene (trade-name of a dynamically vulcanized thermoplastic elastomer of A.E.S. which is considered to contain polypropylene, EPDM, oil and fillers) and that described in Italian patent application IT-A-MI 94/A 01790, can be mentioned. The latter basically consists of:
a) polypropylene, or copolymers of propylene with other alpha-olefins, in a quantity of between 15 and 70% by weight, preferably between 20 and 60% by weight;
b) from 2 to 20%, preferably from 4 to 15% by weight of polyisobutene;
c) from 20 to 70% by weight, particularly from 30% to 60% by weight of elastomeric terpolymer ethylene-propylene-diene (EPDM);
d) from 0 to 35% by weight, preferably from 3 to 30% by weight of elastomeric copolymer ethylene-propylene (EPM);
e) from 3 to 30% by weight, preferably from 5 to 20% by weight of polybutadiene;
the percentage sum of the components from (a) to (e) being equal to 100;
the sum of components (c), (d) and (e) normally being vulcanized in a percentage higher than 92%.

The adhesive thermoplastic composition of the present invention is presumed to consist (but there is no exact experimental evidence) of two thermoplastic elastomeric phases of which one is continuous, and a dispersed elastomeric phase consisting of particles with dimensions of less than 50 μm.

The term EPDM refers to elastomeric terpolymers containing from 20 to 60% by weight, preferably between 25 and 45% by weight, of propylene, from 40 to 75% by weight of ethylene and from 2% to 11% of non-conjugated dienes, for example, 1,4-hexadiene, norbornadiene, ethylidene-norbornene, dicyclopentadiene.

The term EPM refers to elastomeric copolymers ethylene-propylene having a content of propylene of between 20 and 60% by weight, preferably between 20 and 45% by weight.

The polyethylene used as component (2) of the adhesive composition of the present invention must have a density equal to or less than 0.920 g/cm$^3$. It is therefore possible to use as components of the present invention all the polyethylenes belonging to the group of VLDPE (very low density polyethylene), characterized by a density of less than 0.920, and among the LLDPE (linear low density polyethylene), only those having a density equal to or less than 0.920.

On the contrary, polyethylenes of the HDPE (high density polyethylene) and LDPE (low density polyethylene) type and LLDPE with a density higher than 0.920, are not part of the composition of the present invention.

A further object of the present invention relates to a process for the preparation of the adhesive thermoplastic composition as defined above, the above process comprising the following steps:

a) mixing of the TPV, polyethylene and possible additives in a mixer, preferably closed, even more preferably in an extruder, at a temperature of between 170 and 250° C., preferably between 200 and 230° C., until the components have been homogenized;

b) recovery of the adhesive thermoplastic composition obtained in step (a).

There is no criticality in the order of addition of the components in the above process. The temperature, on the other hand is critical, in the sense that it must be within the above range, in which the plastic component, usually polypropylene, melts.

The process described above comprises the use of a commercial TPV which is mixed with the polyethylene and possible additives. Alternatively, if the TPV is self-produced by dynamic vulcanization, the adhesive thermoplastic composition of the present invention can be obtained by adding the polyethylene and possible additives immediately after the vulcanization step which forms the TPV.

As far as the inert products are concerned, these can already be sufficiently contained in the TPV, or they can be added, partially or totally, during the homogenization phase. It is preferably however for the possible additives to be already contained, either totally or partially, preferably totally, in the starting TPV.

When an extruder is used, the adhesive material is granulated at the outlet from the die.

If a closed mixer of the Banbury type is used, the adhesive material thus prepared is transferred to an open mixer to obtain sheets which can granulated if desired.

The granules thus obtained are used to make suitably shaped articles.

The composition of the present invention has adhesive properties particularly with respect to vulcanized EPDE and/or EPM rubbers. These rubbers, containing varying quantities of fillers, oil, antioxidants and other additives normally used in this field, are vulcanized in accordance with the known techniques, for example with sulphur or peroxides.

Owing to its adhesive properties, the composition of the present invention is particularly suitable for firmly adhering to articles basically consisting of vulcanized EPDM and/or EPM rubbers, and for binding parts of vulcanized EPM and EPDM to each other.

In accordance with this, the present invention also relates to articles comprising:

i) one or more parts basically consisting of vulcanized EPDM or EPM rubber, joined, so as to form a single element, with ii) one or more parts basically consisting of the adhesive thermoplastic composition defined below.

The articles of the present invention can be obtained with the usual transformation techniques of thermoplastic materials, in order to obtain pieces, welded to EPM or EPDM rubber, of the desired shape, properties and appearance.

Examples of these techniques are compression, injection, transfer and rotational moulding. All these techniques are in fact suitable for the contact and adhesion of the adhesive thermoplastic composition with the vulcanized EPDM or EPM.

The articles of the present invention therefore comprise, for example, shaped articles of EPM and/or EPDM rubber welded together with joint elements consisting of the adhesive thermoplastic composition of the present invention.

For example it is useful to remember sealing gaskets for car's wind-screens consisting of elements in vulcanized EPM or EPDM rubber welded to each other by curvilinear joint elements basically consisting of the adhesive thermoplastic composition of the present invention.

The method used so far for the production of this type of gasket comprises the extrusion and subsequent vulcanization of a linear profile consisting of a composition containing EPDM. The profile was then cut and the pieces were welded in suitable moulds, in which the two pieces were then brought together, and a mixture in suitable EP(D)M was injected into the mould and then vulcanized.

The process of the prior art has a first disadvantage due to the long operating times and a second one due to the production of many non-recyclable waste products, owing to the necessity of trimming to eliminate the flashes.

According to the process of the present invention, the above articles are prepared by applying, by means of moulding, the adhesive thermoplastic material of the present invention to the profile of vulcanized rubber of the EPDM and/or EPM type.

The process of the present invention has numerous advantages, among which the elimination of the vulcanization step and recycling of the material.

The following examples provide a better understanding of the present invention.

EXAMPLES

The adhesion to EPDM of the thermoplastic composition of the present invention is evaluated by means of ultimate tensile strength tests on C type samples (ASTM D-412) of an average thickness of 2.5 mm., taken from plates with dimensions (13.6×6.8 cm) obtained by welding the adhesive thermoplastic material of the present invention in an injection press to a sheet of vulcanized EPDM, having dimensions of 6.8×6.8 cm and a thickness of 2.5 mm. The C type samples have, in the centre, the joining point between the vulcanized elastomeric phase and the adhesive composition of the present invention. The samples were stretched according to regulation ASTM D 412 relating to the ultimate tensile strength measurement.

EXAMPLES 1–7

Table 1 shows the compositions and adhesion values of some thermoplastic compositions consisting of TPV and polyethylene (formulations 2 to 7) and TPV alone (formulation 1).

Formulations 2 to 5 are a part of the present invention, whereas formulations 1, 6 and 7 should be considered comparative examples.

The thermoplastic elastomeric materials of formulations 2 to 7 were obtained by mixing 50% by weight of Santoprene 73 and 50% by weight of different types of PE.

In example 2 the polyethylene Clearflex MQFO, a polyethylene of the VLDPE type, is used, characterized by a density equal to 0.895 g/cm$^3$, a melt flow index at 190° C. of 13 g/10 min. and a melting point of 111° C.

In example 3 the polyethylene Clearflex MQBO of the VLDPE type, is used, characterized by a density equal to 0.911 g/cm$^3$, a melt flow index at 190° C. of 13 and melting point of 116° C.

In example 4, the PE used is Clearflex CHDO, a PE of the VLDPE type (density=0.900, melt flow index=2, melting point=115° C.).

In example 5, Flexirene MS20 is used, a PE of the LLDPE type, with a density equal to 0.918, melt flow index=26, melting point=116° C.

In comparative example 6, Eraclene MP90 is used, a PE of the HDPE type, having a density of 0.960 and melt flow index=7.

In comparative example 7, Riblene FC20 is used, a PE of the LDPE type, with a density equal to 0.922, a melt flow index=0.27 and a melting point of 113° C.

In all the formulations a composition is used in EPDM normally used for compact profiles and vulcanized with sulphur. This composition consists of 24% by weight of an EPDM (having a propylene content of between 25 and 30% and an ENB content (ethylidene norbornene) of between 3.5 and 5%), 22% by weight of oil, 39% of carbon black and 15% of mineral fillers, processing aids and vulcanizing agents.

TABLE 1

| TEST | 1C | 2 | 3 | 4 | 5 | 6C | 7C |
|---|---|---|---|---|---|---|---|
| Santoprene 73 | 100 | 50 | 50 | 50 | 50 | 50 | 50 |
| Clearfl. MQFO | — | 50 | — | — | — | — | — |
| Clearfl. MQBO | — | — | 50 | — | — | — | — |
| Clearfl. CHDO | — | — | — | 50 | — | — | — |
| Flexir. MS20 | — | — | — | — | 50 | — | — |
| Eraclene MP90 | — | — | — | — | — | 50 | — |
| Riblene FC 20 | — | — | — | — | — | — | 50 |
| Adhesion (MPa) | 0.7 | 2.3 | 3.6 | 2.3 | 3.8 | 0.5 | 1.6 |

As can be clearly seen from the data of examples 2 to 5, the adhesive power of the compositions of the present invention increases considerably with respect to TPV alone (comparative example 1C).

Compared to the compositions of the present invention, mixtures of TPV and Polyethylenes of the HDPE and LDPE type have much lower adhesive properties.

EXAMPLES 8–12

Table 2 shows the compositions and adhesion values of some thermoplastic elastomeric materials.

Formulations 9 to 11 form part of the present invention, whereas formulations 8 and 12 should be considered comparative examples.

The TPV indicated in example 8 (comparative) belongs to those described in Italian patent application IT-A-MI 94/A 01790. This TPV was obtained by the dynamic vulcanization of a composition consisting of 100 parts of EPDM, 50 parts of polypropylene, 10 parts of polybutadiene, 10 parts of polyisobutene, 3.5 parts of peroxide, 70 parts of extension oil, 50 parts of filler, 1 part of vulcanization coagent, 16 parts of processing aids.

The polypropylene used in this TPV is a homopolymer having a fluidity degree (230° C. and 216 N-ASTM D 1238/L) equal to 0.3 dg/g, specific weight of 0.9 g/cm$^3$ and a melting point of 160° C.

The EPDM of this TPV has a content of propylene equal to 28% by weight, of ethylene of 68% and ethylidene-norbornene of 4%; the Mooney viscosity (1+4) 125 is 43; the content of paraffinic oil is 40%.

The butadienic rubber of the TPV has a Mooney viscosity ML(1+4)100 equal to 43 and a content of microstructure cis>98%.

The type of polyisobutene has an intrinsic viscosity of 3.7 dl/g in diisobutene and a specific weight of 0.92 g/cm$^3$.

The adhesive thermoplastic material of example 9–11 was obtained by mixing various percentages (see table 2) of the TPV described above and polyethylene.

The percentages were calculated with the sum of the polymers contained in the adhesive TPV equal to 100 and the other additives are not considered.

TABLE 2

| TEST | 8C | 9 | 10 | 11 | 12C |
|---|---|---|---|---|---|
| TPV | 100 | 62 | 35.5 | 15 | — |
| Clearfl. MQBO | — | 38 | 64.5 | 85 | 100 |
| Adhesion (MPa) to listed EPDM | | | | | |
| EPDM 1 | 1.6 | 3.2 | 5.5 | 6.2 | 6.5 |
| EPDM 2 | 2.4 | 3.4 | 4.9 | 5.4 | 5.6 |
| EPDM 3 | 1.4 | 2.7 | 4.2 | 5.7 | 4.6 |
| EPDM 4 | 1.0 | 1.9 | 2.5 | 4.8 | 5.0 |
| EPDM 5 | 1.5 | 2.7 | 4.2 | 4.9 | 4.9 |

EPDM1 indicates a composition of EPDM vulcanized with sulphur. The composition consists of 52% by weight of an EPDM (percentage of polypropylene of between 25 and 30% and ENB of between 3.5 and 5%), 14% by weight of oil, 29% of carbon black and 5% of processing aids and vulcanizing agents.

EPDM2 indicates a composition of EPDM vulcanized with sulphur, consisting of 22% by weight of an EPDM (content of polypropylene of between 25 and 30% and ENB of between 3.5 and 5% by weight), 35% of oil, 41% of carbon black and 2% of processing aids and vulcanizing agents.

EPDM3 indicates a composition of EPDM vulcanized with sulphur, consisting of 26% by weight of an EPDM (content of polypropylene of between 25 and 30% and ENB of between 3.5 and 5% by weight), 26% of oil, 36% of carbon black, 9% of mineral fillers and 3% of processing aids and vulcanizing agents.

EPDM4 indicates a composition of EPDM usually used for compact profiles vulcanized with sulphur. The composition consists of 24% by weight of EPDM (content of polypropylene of between 25 and 30% and ENB of between 3.5 and 5% by weight), 22% of oil, 39% of carbon black and 15% of mineral fillers, processing aids and vulcanizing agents.

EPDM5 indicates a composition of EPDM used for the production of compact clear shaped articles vulcanized with sulphur. The composition consists of 24% by weight of EPDM (content of polypropylene of between 30 and 35% and ENB of between 9 and 10% by weight), 13% of oil, 55% of mineral fillers and 8% of processing aids and vulcanizing agents.

Compositions EPDM1 and EPDM2 correspond to the formulations A and F of example 1 of U.S. Pat. No. 4.537.825. In fact in EPDM1 the content of EPDM is 65% by volume, whereas in EPDM2 the content of EPDM is 30% by volume, as described in U.S. Pat. No. 4.537.825.

From the data of table 2, in particular from the tests carried out on EPDM1, it can be clearly seen that the adhesive composition of the present invention proves to be efficient even when the content in volume % of EPDM is higher than 50%. It should be noted that U.S. Pat. No. 4.537.825 specified that good adhesions could be obtained only on compositions containing an EPDM % of less than 50% by volume.

The data of table 2 show how the adhesive properties increase with an increase in the quantity of polyethylene.

Table 3 on the other hand indicates the other characterizations carried out on the same formulations

TABLE 3

| TEST | 8C | 9 | 10 | 11 | 12C |
|---|---|---|---|---|---|
| Yield stress D638 (MPa) | — | — | 4.8 | 6.1 | 7.9 |
| Breaking stress D638 (MPa) | 5.2 | 6.1 | 6.2 | 8.3 | 9.8 |
| Elong. to break D638 (%) | 220 | 235 | 435 | 680 | 740 |
| Tens. Set D412 (%) | 12 | 18 | 28 | 34 | 50 |
| Vicat 1 kg. 50° C./h D1525 (° C.) | 61.5 | 54.0 | 58.5 | 67.0 | 75.0 |
| Shore A/after 5" D2240 | 70 | 80 | 84 | 90 | 90 |

Comparing the data of table 2 with those of table 3, it can be seen how the best balance between adhesive and elastomeric properties is obtained with formulation 10, corresponding to a weight ratio between the TPV (comprising the fillers) and polyethylene of 1/1.

As the TPV used has a content of additives of 45% with respect to the total composition of TPV, the sum of the polymers contained in the adhesive TPV being 100, the percentage of additives contained in the formulations varies as follows: test 8c, 82%; test 9, 53%; test 10, 29%; test 11, 12%; test 12c, 0%.

We claim:

1. An article comprising:
   (i) at least one part consisting essentially of vulcanized EPDM or EPM rubber; and
   (ii) at least one part consisting essentially of an adhesive thermoplastic composition comprising:
   1) a dynamically vulcanized thermoplastic elastomer (TPV) in a quantity of between 15 and 65% by weight; wherein said dynamically vulcanized thermoplastic elastomer forms a continuous phase with thermoplastic properties; and wherein said dynamically vulcanized thermoplastic elastomer consists essentially of at least one polyolefin, in which a partially vulcanized elastomeric phase is finely dispersed;
   2) a polyethylene having a density equal to or less than 0.920 g/cm$^3$, in a quantity of between 85 and 35% by weight; wherein the sum of (1) and (2) is equal to 100;
   3) an additive in a quantity of between 0 and 100 parts by weight per 100 parts of the sum of (1) and (2);
   wherein components (i) and (ii) are joined in such a way as to form a single element.

2. The article according to claim 1, comprising:
   i) one part consisting essentially of said vulcanized EPDM or EPM rubber; and
   ii) one part consisting essentially of said adhesive thermoplastic composition.

3. The article according to claim 1, comprising:
   i) two parts consisting essentially of said vulcanized EPDM or EPM rubber; and
   ii) one part consisting essentially of said adhesive thermoplastic composition.

4. Process for the preparation of an article according to claim 1 which comprises welding at least one part of said vulcanized EPM or EPDM rubber to said adhesive thermoplastic compositions; and
wherein said welding is carried out using moulding techniques selected from compression, injection, transfer and rotational moulding.

5. The article of claim 1, wherein said vulcanized thermoplastic elastomer (1) is present in a quantity of between 25 and 45% by weight, said polyethylene (2) is present in an amount of between 75 and 55% by weight, and said additives (3) is present in an amount of between 10 and 80 parts by weight per 100 parts of the sum of (1) and (2).

6. The article of claim 1, wherein said vulcanized elastomer (1) is present in an amount of between 30 and 40% by weight, said polyethylene (2) is present in an amount of between 70 and 60% by weight, and said additives (3) is present in an amount of between 20 and 70 parts by weight per 100 parts of the sum of (1) and (2).

7. The article of claim 1, wherein said vulcanized elastomer (1), has a content of polypropylene of between 15% and 70% by weight.

8. The article of claim 1, wherein said vulcanized elastomer (1) has a content of polypropylene of between 20% and 60% by weight.

9. The article of claim 1, wherein said vulcanized elastomer (1) is obtained by the dynamic vulcanization of a polymeric composition consisting essentially of:
   a) polypropylene, or a copolymer of propylene with another alpha-olefin, in an amount of between 15 and 70% by weight;
   b) from 2 to 20% by weight of polyisobutene;
   c) from 20 to 70% by weight of elastomeric terpolymer of ethylene-propylene-diene (EPDM);
   d) from 0 to 35% by weight of an elastomeric copolymer of ethylene-propylene (EPM);
   e) from 3 to 30% by weight of polybutadiene;
   wherein the total percentage of the components (a) to (e) is equal to 100; and
   wherein the sum of components (c), (d) and (e) are vulcanized in a percentage higher than 92%.

10. The article of claim 9, wherein said component (a) is present in an amount between 20 and 60% by weight; said component (b) is present in an amount from 4 to 15% by weight; said component (c) is present in an amount from 30 to 60% by weight; said component (d) is present in an amount from 3 to 30% by weight; and said component (e) is present in an amount from 5 to 20% by weight.

11. An article comprising at least two compositionally different parts (i) and (ii), defined below, adhered to each other without intervening adhesive, said parts being:
   (i) at least one first part consisting essentially of a vulcanized EPDM or EPM rubber composition, and
   (ii) at least one second part compositionally different from the first, consisting essentially of an adhesive thermoplastic composition comprising a blend of:
   1) a dynamically vulcanized thermoplastic elastomer (TPV) in a quantity of between 15 and 65% b weight; wherein said dynamically vulcanized thermoplastic elastomer forms a continuous phase with thermoplastic properties; and wherein said dynamically vulcanized thermoplastic elastomer consists essentially of at least one polyolefin, in which a partially vulcanized elastomeric phase is finely dispersed;
   2) a polyethylene having a density equal to or less than 0.920 g/cm$^3$ in a quantity of between 85 and 35% by weight, wherein the sum of (1) and (2)is equal to 100,
   3) an additive in a quantity of between 0 and 100 parts by weight per 100 parts of the sum of (1) and (2);
   wherein parts (i) and (ii) are adhered to each other in such a way as to form a single element.

12. The article according to claim 11, comprising:
   (i) one part consisting essentially of said vulcanized EPDM or EPM rubber composition and (ii) one part consisting essentially of said adhesive thermoplastic composition.

13. The article according to claim 11, comprising:
i) two parts consisting essentially of said vulcanized EPDM or EPM rubber composition, and
(ii) one part consisting essentially of said adhesive thermoplastic composition.

14. Process for the preparation of an article according to claim 11 which comprises welding said adhesive thermoplastic composition to a first part (i),
   wherein said welding is carried out using moulding techniques selected from the group consisting of compression, injection, transfer and rotational moulding.

15. The article of claim 11, wherein in the part(s) (ii) said vulcanized thermoplastic elastomer (1) is present in a quantity of between 25 and 45% by weight, said polyethylene (2) is present in an amount of between 75 and 55% by weight, and said additives (3) is present in an amount of between 10 and 80 parts by weight per 100 parts of the sum of (1) and (2).

16. The article of claim 11, wherein in the part(s) (ii) said vulcanized elastomer (1) is present in an amount of between 30 and 40% by weight, said polyethylene (2) is present in an amount of between 70 and 60% by weight, and said additive (3) is present in an amount of between 20 and 70 parts by weight per 100 parts of the sum of (1) and (2).

17. The article of claim 11, wherein in the part(s) (ii) said vulcanized elastomer (1), has a content of polypropylene of between 15% and 70% by weight.

18. The article of claim 11, wherein in the part(s) (ii) said vulcanized elastomer (1) has a content of polypropylene of between 20% and 60% by weight.

19. The article of claim 11, wherein in the part(s) (ii) said vulcanized elastomer (1) is obtained by the dynamic vulcanization of a polymeric composition consisting essentially of:
a) polypropylene, or a copolymer of propylene with another alpha-olefin, in an amount of between 15 and 70% by weight;
b) from 2 to 20% by weight of polyisobutene;
c) from 20 to 70% by weight of elastomeric terpolymer of ethylene-propylene-diene (EPDM);
d) from 0 to 35% by weight of an elastomeric copolymer of ethylene-propylene (EPM);
(e) from 3 to 30% by weight of polybutadiene;
wherein the total percentage of the components (a) to (e) is equal to 100; and wherein the sum of components (c), (d) and (e) are vulcanized in a percentage higher than 92%.

20. The article of claim 19, wherein said component (a) is present in an amount between 20 and 60% by weight; said component (b) is present in an amount from 4 to 15% by weight; said component (c) is present in an amount from 30 to 60% by weight; said component (d) is present in an amount from 30 to 30% by weight; and said component (e) is present in an amount from 5 to 20% by weight.

21. The article according to claim 11 where the polyethylene component 2) in part (ii) is a polyethylene selected from the group consisting of VLDPE and LLDPE having a density of less than 0.920.

22. The article according to claim 21 where the vulcanized EPDM or EPM rubber composition (i) is a sulfur vulcanized rubber composition.

* * * * *